US012607784B2

(12) United States Patent
Uchida

(10) Patent No.: US 12,607,784 B2
(45) Date of Patent: Apr. 21, 2026

(54) OPTICAL ELEMENT, IMAGING OPTICAL SYSTEM, AND OPTICAL APPARATUS

(71) Applicant: CANON KABUSHIKI KAISHA, Tokyo (JP)

(72) Inventor: Kazue Uchida, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 357 days.

(21) Appl. No.: 18/530,280

(22) Filed: Dec. 6, 2023

(65) Prior Publication Data

US 2024/0201424 A1     Jun. 20, 2024

(30) Foreign Application Priority Data

Dec. 15, 2022     (JP) .................................. 2022-200028

(51) Int. Cl.
*G02B 5/08* (2006.01)
(52) U.S. Cl.
CPC .................................. *G02B 5/0833* (2013.01)
(58) Field of Classification Search
CPC .......... G02B 1/11; G02B 5/0833; G02B 1/115
See application file for complete search history.

(56) References Cited

U.S. PATENT DOCUMENTS

| | | | |
|---|---|---|---|
| 10,705,259 B2 | 7/2020 | Uchida | |
| 11,435,507 B2 | 9/2022 | Uchida | |
| 11,513,440 B2 | 11/2022 | Uchida | |
| 2014/0016204 A1* | 1/2014 | Hakuta | G02B 1/11 |
| | | | 359/601 |
| 2015/0146166 A1* | 5/2015 | Weber | G02B 5/283 |
| | | | 359/359 |
| 2017/0276839 A1* | 9/2017 | Teramoto | G02B 5/003 |
| 2019/0137662 A1* | 5/2019 | Abe | C09D 5/00 |
| 2024/0142667 A1 | 5/2024 | Uchida | |

FOREIGN PATENT DOCUMENTS

| | | | |
|---|---|---|---|
| JP | 3295583 B2 | 6/2002 | |
| JP | 2009-237509 A | 10/2009 | |
| JP | 4419281 B2 | 2/2010 | |
| JP | 2011022432 A * | 2/2011 | |
| JP | 2022-155929 A | 10/2022 | |

OTHER PUBLICATIONS

Yokokawa, the English translation for JP 2011022432A (Year: 2011).*

* cited by examiner

*Primary Examiner* — Jonathan Y Jung
(74) *Attorney, Agent, or Firm* — Carter, DeLuca & Farrell LLP

(57) ABSTRACT

An optical element for an imaging optical system includes a substrate including a curved surface, and a multilayer film formed on the curved surface. The multilayer film includes a plurality of first films made of a first material and a plurality of second films made of a second material, each of the plurality of first films and each of the plurality of second films are alternately laminated. A predetermined inequality is satisfied.

15 Claims, 12 Drawing Sheets

OPTICAL ELEMENT, IMAGING OPTICAL SYSTEM, AND OPTICAL APPARATUS

BACKGROUND

Technical Field

One of the aspects of the embodiments relates to an optical element having a multilayer film that reflects and transmits light.

Description of Related Art

In an optical apparatus such as a head mounted display (HMD), an optical path is folded using a half mirror (a reflective and transmissive surface) and polarization to secure a necessary optical path length while a size and weight of the optical apparatus is reduced.

Japanese Patent No. 3295583 discloses an optical system using a catadioptric element whose convex surface is coated with a half mirror, and a circularly polarized light selective semi-transparent mirror. Japanese Patent No. 4419281 discloses an optical system using a transmissive refractive element whose concave surface is coated with a half mirror, and a circularly polarized light selective semi-transparent mirror provided on an aspherical resin lens.

SUMMARY

An optical element for an imaging optical system includes a substrate including a curved surface, and a multilayer film formed on the curved surface. The multilayer film includes a plurality of first films made of a first material and a plurality of second films made of a second material, each of the plurality of first films and each of the plurality of second films are alternately laminated. The following inequalities are satisfied:

$$\varphi \geq 20°$$

$$0.75 \leq D_Q/D_C \leq 0.95$$

$$1.4 \leq n_L(587.56) \leq 1.6$$

$$1.9 \leq n_H(587.56) \leq 2.4$$

$$n_H(587.56) - n_L(587.56) \geq 0.40$$

$$1/(n_H(420) - n_H(680)) \geq 4.5$$

where $\varphi$ is a maximum value of a half open angle in an optically effective area of the curved surface, $D_C$ is a total film thickness of the multilayer film at a position at which the half open angle is $0°$, $D_Q$ is a total film thickness of the multilayer film at a position at which the half open angle is $\varphi$, $n_L(\lambda)$ is a refractive index of the first material at a wavelength $\lambda$ [nm], and $n_H(\lambda)$ is a refractive index of the second material at the wavelength $\lambda$ [nm]. An imaging optical system and an optical apparatus having the above optical element also constitute another aspect of the embodiment.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

Figure 1A:
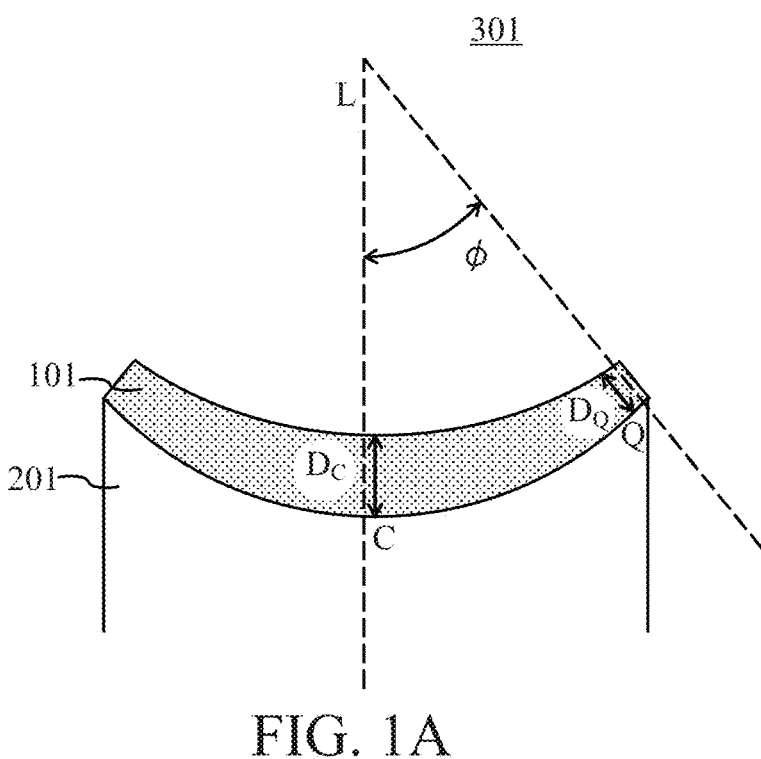
FIGS. 1A and 1B are schematic diagrams which illustrate optical elements according to Examples.
Figure 1B:
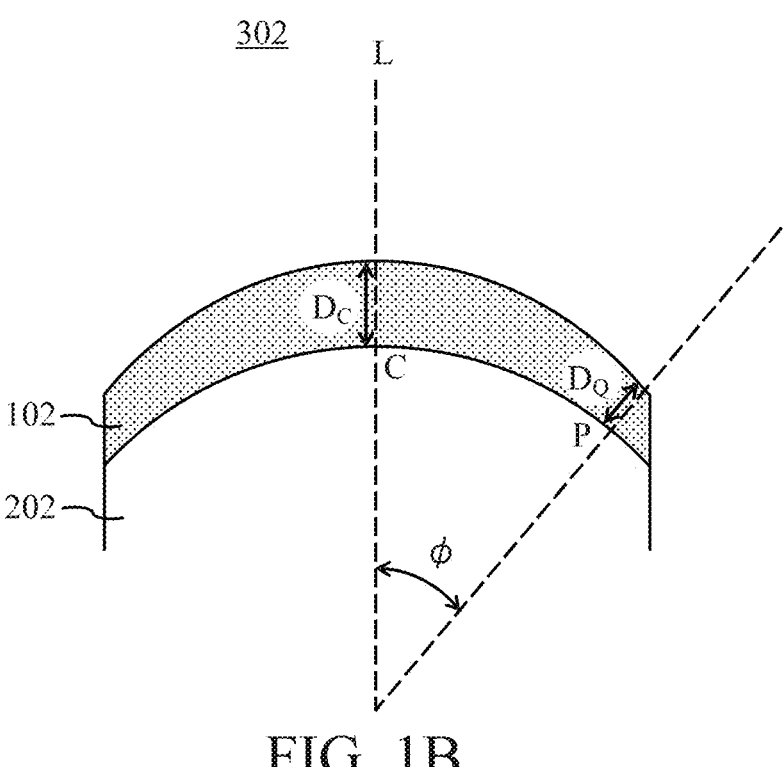

FIGS. 1A and 1B schematically show optical elements 301 and 302 as typical examples of the present disclosure, respectively. The optical elements 301 and 302 are used in an imaging optical system such as an observation optical system of an optical apparatus such as an HMD or an image pickup optical system of an image pickup apparatus such as a camera.

The optical element 301 shown in FIG. 1A includes a transparent substrate 201 and a half mirror 101 that is a dielectric multilayer film in which a plurality of thin films are laminated. The half mirror here means a transmissive and reflective surface that is responsible for both transmission and reflection. That is, a ratio of a transmittance and reflectance of the half mirror is not limited to 1:1. The optical element 302 shown in FIG. 1B includes a transparent substrate 202 and a half mirror 102 that is a dielectric multilayer film. In FIGS. 1A and 1B, illustrations of lens surfaces to which the half mirrors 101 and 102 are not provided are omitted. FIG. 1A shows a case where a lens surface which forms the half mirror 101 on the transparent substrate 201 is concave, and FIG. 1B shows a case where a lens surface which forms the half mirror 102 on the transparent substrate 202 is convex.

Lens surfaces of the optical elements 301 and 302 have a curved surface shape having a rotationally symmetrical axis, that is, a rotationally symmetrical curved surface shape. The curved surface shape may be spherical or aspherical. In FIG. 1A, position C is a center of a lens surface of the transparent substrate 201 to which the half mirror 101 is provided, and is an intersection of the rotationally symmetrical axis of the lens surface (hereinafter referred to as an optical axis) L and the lens surface of the transparent substrate 201. $D_C$ indicates a total film thickness of the half mirror 101 at position C. Position Q is an outermost position in an optically effective area (an area through which light beams that form an image in an image circle in the optical system pass) on the lens surface of the transparent substrate 201. When an angle between the optical axis L and a normal to position Q (hereinafter referred to as a half open angle) is $\varphi$, the half open angle $\varphi$ is a maximum value of a half open angle in the optically effective area. $D_Q$ indicates a total film thickness of the half mirror 101 at position Q. $D_C$, $D_Q$, C, Q, and $\varphi$ shown in FIG. 1B are also the same as those in FIG. 1A.

Generally, in a dry method such as a sputtering method or a vapor deposition method, film formation is performed by installing an evaporation source so as to face a center of a lens (position C in the examples). In this case, if a film is formed on a lens surface with a small radius of curvature (i.e., a lens surface with a large half open angle) by the dry method, an incident angle of a vapor deposition material increases toward a periphery of the lens surface, resulting in a decrease in a film thickness compared to the center of the lens surface. If the film thickness of the vapor deposition material at the center is D, the film thickness at the half open angle $\psi$ is approximately $D*\cos(\psi)$. In other words, the film thickness when the half open angle is 40° is about 75% of the film thickness at the center. Therefore, the larger the half open angle of the lens surface, the larger a film thickness distribution within the lens surface.

In the examples, the half open angle $\varphi$ (°) at position Q satisfies the following inequality (1).

$$\varphi \ge 20° \qquad (1)$$

For a lens with $\varphi < 20°$, the film thickness distribution within an optical surface of the half mirror 100 is small and variations in the reflectance is also small, so changes in the reflectance characteristics do not pose a problem.

The numerical range of the inequality (1) is more preferably the numerical range of the inequality (1)' below.

$$\varphi \ge 25° \qquad (1)'$$

Further, the numerical range of the inequality (1) is more preferably the numerical range of the inequality (1)" below.

$$\varphi \ge 30° \qquad (1)''$$

In the examples, the total film thickness $D_Q$ of the half mirror 100 at position Q satisfies the following inequality (2).

$$0.75 \le D_Q/D_C \le 0.95 \qquad (2)$$

When $D_Q/D_C$ is greater than a value of 0.95, a problem of in-plane variation in antireflection performance does not occur. When $D_Q/D_C$ is smaller than a value of 0.75, a difference in the film thickness is too large, making it difficult to form a high-performance half mirror.

Figure 2:
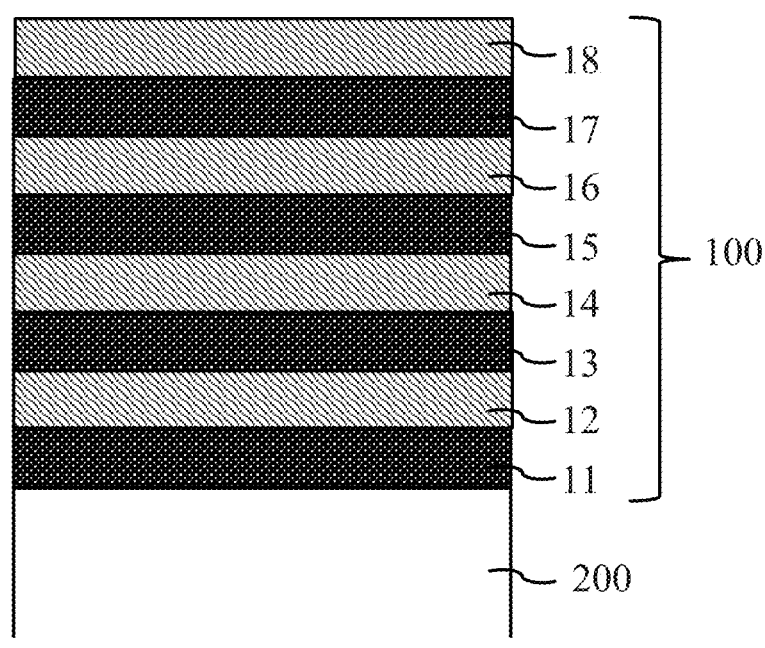
FIG. 2 is a schematic diagram which illustrates a film configuration according to Example 1 and Comparative Examples 1 and 2.

FIG. 2 shows a film configuration at position C of the half mirror 100 of the examples. The half mirror 100 is composed of thin films 11, 12, 13, 14, 15, 16, 17, and 18 in order from a side of the transparent substrate 200. The thin films 12, 14, 16, and 18 are made of a first material, and the thin films 11, 13, 15, and 17 are made of a second material. That is, the half mirror 100 is configured by alternately laminating thin films made of the first material and thin films made of the second material.

When a wavelength of incident light onto the half mirror 100 is $\lambda$ (in this case 587.56 nm for the d-line), a refractive index of the first material at the wavelength $\lambda$ is $n_L(\lambda)$, and a refractive index of the second material at the wavelength $\lambda$ is $n_H(\lambda)$, the half mirror 100 satisfies the following inequalities (3) and (4). Specific examples of the first and second materials will be described later.

$$1.4 \le n_L(587.56) \le 1.6 \qquad (3)$$

$$1.9 \le n_H(587.56) \le 2.5 \qquad (4)$$

The numerical ranges of the inequalities (3) and (4) are more preferably the numerical ranges of the inequalities (3)' and (4)' below.

$$1.4 \le n_L(587.56) \le 1.5 \qquad (3)'$$

$$2.1 \le n_H(587.56) \le 2.4 \qquad (4)'$$

In addition, the half mirror 100 of the examples satisfies the following inequality (5). Both the first material and the second material are dielectric materials, and the larger the difference in refractive index between these materials, the better the performance of the half mirror.

$$n_H(587.56) - n_L(587.56) \ge 0.40 \qquad (5)$$

The numerical range of the inequality (5) is more preferably the numerical range of the inequality (5)' below.

$$n_H(587.56) - n_L(587.56) \ge 0.50 \qquad (5)'$$

Further, the numerical range of the inequality (5) is more preferably the numerical range of the inequality (5)'' below.

$$n_H(587.56) - n_L(587.56) \geq 0.70 \qquad (5)''$$

In addition, the half mirror 100 of the examples satisfies the following inequality (6).

$$1/(n_H(420) - n_H(680)) \geq 4.5 \qquad (6)$$

The numerical range of the inequality (6) is more preferably the numerical range of the inequality (6)' below.

$$1/(n_H(420) - n_H(680)) \geq 5.0 \qquad (6)'$$

In general, a dielectric material has a large energy gap across a visible region of wavelengths from 400 to 700 nm. Due to this energy gap, the dielectric material exhibits normal dispersion in which a refractive index gradually decreases from a short wavelength side to a long wavelength side in the visible region. A dielectric material with a high refractive index, such as the second material, that satisfies the inequality (4) has a more rapid change in refractive index in the visible region than the first material that satisfies the inequality (3). In other words, a refractive index dispersion is large. A reflectance R is expressed as n*d/λ, where d is a film thickness, n is a refractive index, and λ is a wavelength. In film design, the film thickness d is determined so that reflectance characteristics fall within a certain range in a certain wavelength band. As the wavelength λ changes, the refractive index n also changes, so the greater the refractive index dispersion of the second material, the greater the change in the reflectance characteristics. In the examples, the refractive index dispersion of the second material is specified to keep the change in the reflectance characteristics as small as possible, even when the film thickness d is changed.

By satisfying the inequality (6), the half mirror 100 of the examples has a large half open angle and a film thickness distribution along the lens surface, but variations in reflectance depending on positions are small. That is, when a reflectance at position C (a position at a half open angle of 0°) at an incident angle of 0° (hereinafter referred to as 0° incidence) at a wavelength of λ nm is $R_C(\lambda)$ and a reflectance at position Q (a position at a half open angle φ) at a 0° incidence at a wavelength of λ nm is $R_Q(\lambda)$, the following inequalities are desirably satisfied in an entire wavelength range of 420 to 680 nm.

$$45\% \leq R_C \leq 55\% \qquad (7)$$

$$45\% \leq R_Q \leq 55\% \qquad (8)$$

When film thicknesses of the thin films (hereafter referred to as layers) 11, 12, 13, 14, 15, 16, 17, and 18 are $d_{11}$, $d_{12}$, $d_{13}$, $d_{14}$, $d_{15}$, $d_{16}$, $d_{17}$, and $d_{18}$ (nm), respectively, the total film thickness $D_C$ at position C can be expressed by the following equation (9).

$$DC = d_{11} + d_{12} + d_{13} + d_{14} + d_{15} + d_{16} + d_{17} + d_{18} \qquad (9)$$

When a total film thickness of a layer made of the first material at position C is $D_{CL}$ and a total film thickness of a layer made of the second material is $D_{CH}$, the following equations are satisfied.

$$D_{CL} = d_{12} + d_{14} + d_{16} + d_{18} \qquad (10)$$

$$D_{CH} = d_{11} + d_{13} + d_{15} + d_{17} \qquad (11)$$

$$D_C = D_{CL} + D_{CH} \qquad (12)$$

Then, the following inequality is desirably satisfied.

$$0.20 \leq D_{CH}/D_C \leq 0.40 \qquad (13)$$

The numerical range of the inequality (13) is more preferably the numerical range of the inequality (13)' below.

$$0.22 \leq D_{CH}/D_C \leq 0.40 \qquad (13)'$$

In the half mirror 100 of the examples, the layer 18 farthest from the transparent substrate 200 is made of the first material, the next farthest layer made of the first material from the transparent substrate 200 after the layer 18 is the layer 16, and the next layer made of the first material away from the layer 16 is the layer 14.

Then, taking nm as a unit, the film thickness $d_{14}$ at position C preferably satisfies the following inequality (14).

$$100 \leq d_{14} \leq 180 \qquad (14)$$

In addition, the film thickness $d_{16}$ at position C preferably satisfies the following inequality (15).

$$100 \leq d_{16} \leq 180 \qquad (15)$$

When the number of layers (films) of the half mirror 100 is m and a film thickness of the m-th layer from a substrate side is $d_m$, the inequalities (14) and (15) can be rewritten as the following inequalities (16) and (17).

$$100 \leq d_{m-4} \leq 180 \qquad (16)$$

$$100 \leq d_{m-2} \leq 180 \qquad (17)$$

In addition, the number of layers m of the half mirror 100 preferably satisfies the following inequality (18).

$$8 \leq m \leq 11 \qquad (18)$$

The film thicknesses of the (m−4)-th layer and (m−2)-th layer made of the first material are parameters related to a wavelength band in which the half mirror 100 achieves a desired goal. When the film thicknesses of these two layers satisfy the inequality (16), and preferably the inequality (17), the wavelength band in which the desired goal can be achieved becomes wider, and the characteristics are less affected by thickness variation.

When a coefficient of thermal expansion of the transparent substrate 200 is $\alpha$ ($10^{-5}$/° C.), the following inequality (19) is preferably satisfied.

$$1.5 \leq \alpha \leq 30.0 \tag{19}$$

The transparent substrate 200 is made of a resin material. As described above, since the optical element of the examples is used in an optical system of an optical apparatus such as an HMD, reduction in size and weight is desired. The transparent substrate 200 used in the half mirror 100 is preferably made of a lightweight resin material.

The first material is preferably a material containing silicon oxide. Further, it is more desirable to use a material containing silicon oxide in which a trace amount of aluminum is contained. Furthermore, it is desirable that the first material contains aluminum having a weight ratio of 0.001% or more and 10% or less, and silicon oxide having a weight ratio of 90% or more. When the transparent substrate 200 is made of a resin material, it easily expands. For this reason, it is better to form a film with large compressive stress on the resin substrate to prevent film cracking and film peeling. A film containing silicon oxide has large compressive stress. Furthermore, by containing a trace amount of aluminum, compressive stress can be increased. Even minute amounts of aluminum content, as small as 0.001% by weight, have an effect on compressive stress.

The second material is preferably a material containing at least one of titanium oxide or niobium oxide. When the transparent substrate 200 is made of a resin material, heating causes deformation and cracking. For this reason, the half mirror 100 must be formed by vapor deposition without heating (or with heating at a low temperature of 80° C. or lower). Titanium oxide and niobium oxide can satisfy the inequalities (4) to (6) even if a non-heating vapor deposition method is used. As the titanium oxide, $TiO_2$ having one titanium atom and two oxygen atoms is preferable. This is because when the film is formed by non-heating vapor deposition when the number of oxygen atoms is smaller than twice the number of titanium atoms (e.g., $Ti_4O_7$), the dispersion becomes large, so that the inequality (8) is often not satisfied. Even more desirably, the second material is $TiO_2$ or $Nb_2O_5$. In particular, $Nb_2O_5$ has a relatively small radiant heat and a small thermal effect on a resin, which prevents deformation and cracking of the transparent substrate 200. In addition, $Nb_2O_5$ has a smaller refractive index dispersion than $TiO_2$ and satisfies the inequality (9), so changes in reflectance characteristics due to variations in film thickness can be better suppressed.

The method for forming the half mirror 100 is not particularly limited as long as it is a physical vapor deposition method such as a vapor deposition method, a sputtering method, or an ion plating method. The vapor deposition method is particularly desirable because of its simplicity in adjusting film thickness and refractive index. In the vapor deposition method, methods for heating the vapor deposition material include a resistance heating method, an electron beam vapor deposition method, a laser vapor deposition method, and an ion beam assist method. The electron beam vapor deposition method is a desirable heating method because it can directly heat a film material, allowing the film to be formed in an unheated state to the substrate, and quality of the film is relatively high with little contamination.

The ion beam assist method is also a desirable heating method because an independent ion source plays a role of assisting the vapor deposition, which results in the formation of a dense film with low absorption and scattering and high intensity. In the vapor deposition using the ion beam assist method, a magnitude and dispersion of the refractive index vary depending on a flow rate of an assist gas during film formation (pressure during film formation), ion current density and film formation rate. In the examples, the second material needs to satisfy the inequality (4) or the inequalities (6) and (8). In order to satisfy these inequalities, it is desirable to confirm in advance that these inequalities are satisfied by forming a single layer of a vapor deposition material.

Specific examples (experimental examples) are shown below.

Example 1

Figure 3:
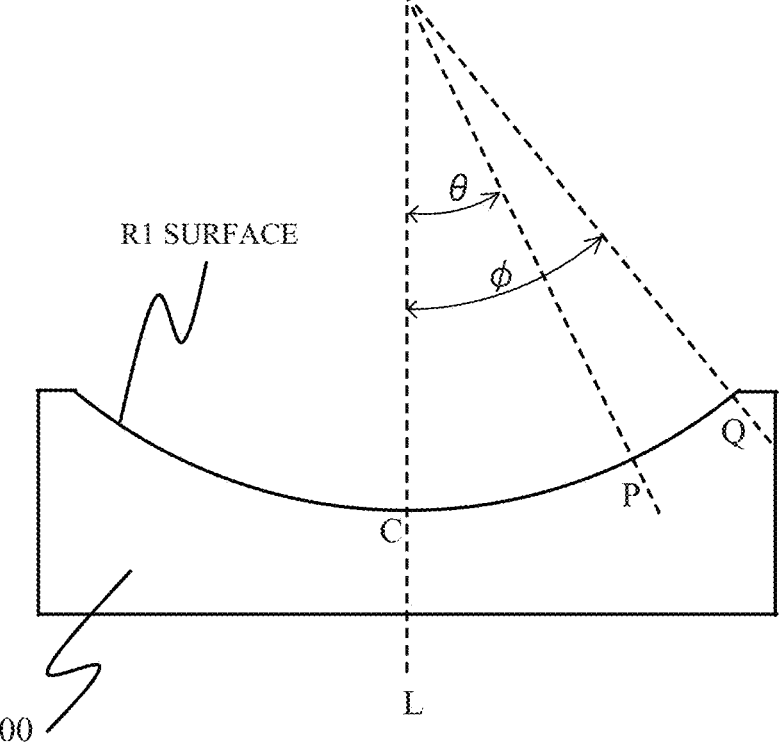
FIG. 3 is a schematic diagram of a cross-section of an optical element according to Examples 1 and 2 and Comparative Examples 1 and 2.

FIG. 3 shows a cross-section of the optical element (lens) according to Example 1. The positions C, Q, and L in FIG. 3 and the maximum value $\varphi$ of the half open angle are the same as those in FIG. 1. The R1 surface of the transparent substrate 200 is a surface to which the half mirror 100 according to Example 1 is provided. The illustration of the half mirror 100 in FIG. 3 is omitted. Position P is a position corresponding to the half open angle $\theta$, and is a position on a plane including the optical axis L, position C, and position Q. FIG. 2 shows the eight-layer film configuration of the half mirror 100 at position C.

In Example 1, APEL (manufactured by Mitsui Chemicals, Inc.) with a refractive index of 1.54 in the d-line is used as a material for the substrate 200. The R1 surface which forms the half mirror 100 has a concave shape. The half open angle $\varphi$ at position Q is 40°, which satisfies the inequality (1). As layer materials, $SiO_2$ (containing Al: 4.5% by weight) is used for the thin films 12, 14, 16, and 18, and $Nb_2O_5$ is used for the thin films 11, 13, 15, and 17.

In Example 1, the half mirror 100 is formed by the vapor deposition method. Electron beams are used to heat the vapor deposition materials, $SiO_2$ and $Nb_2O_5$. In order to form a denser film, the ion beam assist vapor deposition method is used. The inside of a vacuum chamber of a vapor deposition apparatus is evacuated to a high vacuum region of around $2*10^{-3}$ (Pa). After confirming that the inside of the vacuum chamber is in a high vacuum state, Ar as an inert gas is introduced into an ion gun, and the ion gun is discharged. Table 1 shows film formation inequalities for each vapor deposition material.

Figure 4:
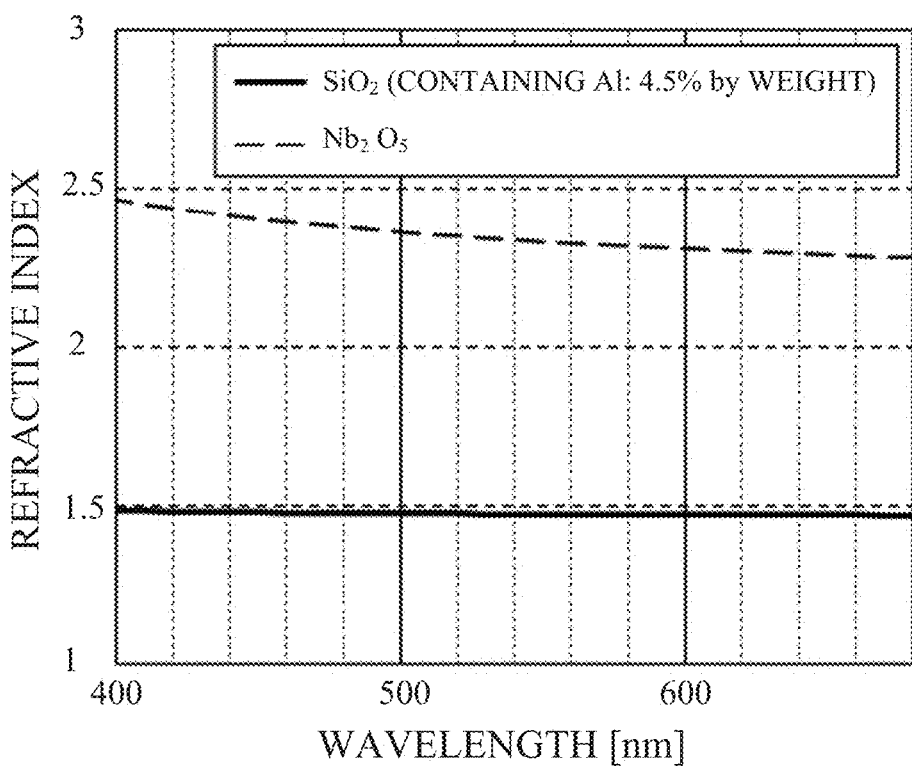
FIG. 4 is a diagram which illustrates refractive index characteristics of a vapor deposition material according to Example 1.

FIG. 4 shows the refractive index dispersion of each vapor deposition material deposited using the inequalities shown in Table 1. The refractive index of $SiO_2$ (containing Al: 4.5% by weight) at the d-line is 1.47, and the refractive index of $Nb_2O_5$ at the d-line is 2.31. These satisfy the inequalities (3), (4), and (5). The refractive index of $Nb_2O_5$ at a wavelength of 420 nm is 2.43, and the refractive index of $Nb_2O_5$ at a wavelength of 680 nm is 2.28. For this reason, $1/(n_H(420)-n_H(680))$ is 6.47, which satisfies the inequality (6).

Table 2 shows the total film thickness of the half mirror 100, the total film thickness of $Nb_2O_5$, and film thicknesses of the thin films 11 to 18, at position C at which the half open angle is 0°, position P at which the half open angle θ is 26°, and position Q at which the half open angle is 40°. From Table 2, it can be confirmed that Example 1 satisfies the inequality (2). Furthermore, at position C, the inequality (13) is satisfied. Furthermore, the inequalities (16) and (17) are also satisfied.

Figure 5:
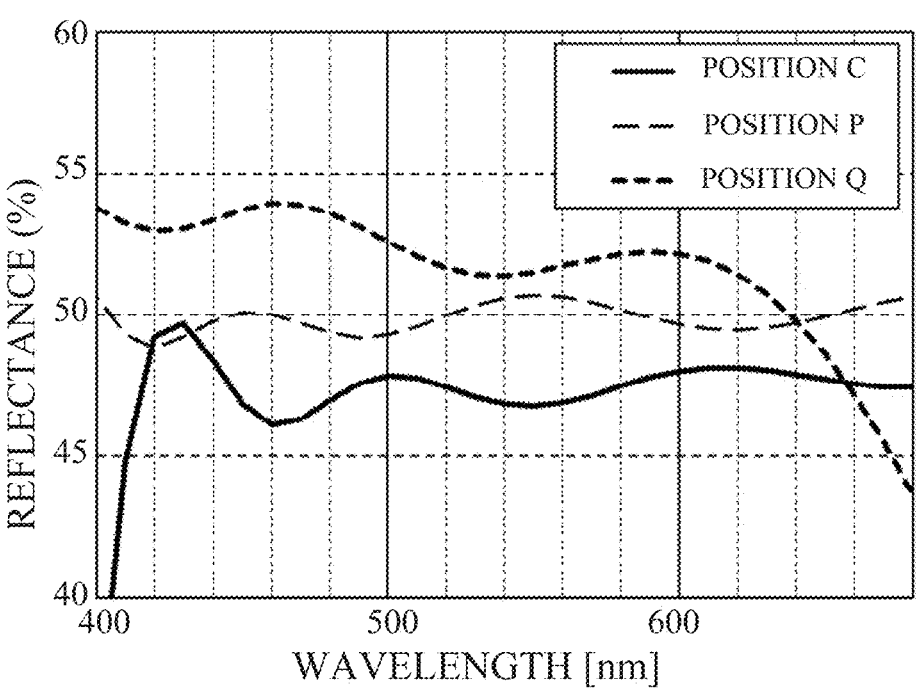
FIG. 5 is a diagram which illustrates reflectance characteristics for $0°$ incident light according to Example 1.

FIG. 5 shows the reflectance characteristics of the half mirror 100 according to Example 1 at positions C, P, and Q with respect to 0° incident light. Although the film thickness of the half mirror 100 varies depending on positions of the half open angle on the transparent substrate 200, good reflectance characteristics are achieved, with reflectance ranging between 45% and 55% at wavelengths from 420 nm to 680 nm.

TABLE 1

| Vapor Deposition Material | Film Formation Rate Å/s | Film Forming Pressure ×10⁻² Pa | Introduced Gas (Vacuum Chamber) | Assist Gas (Ion Beam) | Ion Current Density μA/cm² |
|---|---|---|---|---|---|
| SiO₂ (containing Al: 4.5% by weight) | 6 | 1.8 | Oxygen | Oxygen | 23 |
| Nb₂O₅ | 6 | 2.6 | Oxygen | Oxygen | 50 |

TABLE 2

| | Position | C | P | Q |
|---|---|---|---|---|
| | Half Open Angle | 0° | 26° | 40° |
| | | | Physical Film Thickness (nm) | |
| | Half Mirror Total Film Thickness | 609.2 | 548.3 | 463.0 |
| | Nb₂O₅ Total Film Thickness | 205.8 | 185.2 | 156.4 |
| Half Mirror 100 | Thin Film 18 SiO₂ (containing Al: 4.5% by weight) | 74.7 | 67.2 | 56.7 |
| | Thin Film 17 Nb₂O₅ | 73.9 | 66.5 | 56.1 |
| | Thin Film 16 SiO₂ (containing Al: 4.5% by weight) | 142.7 | 128.4 | 108.5 |
| | Thin Film 15 Nb₂O₅ | 56.5 | 50.9 | 43.0 |
| | Thin Film 14 SiO₂ (containing Al: 4.5% by weight) | 121.1 | 109.0 | 92.1 |
| | Thin Film 13 Nb₂O₅ | 44.3 | 39.9 | 33.7 |
| | Thin Film 12 SiO₂ (containing Al: 4.5% by weight) | 64.9 | 58.4 | 49.3 |
| | Thin Film 11 Nb₂O₅ | 31.1 | 28.0 | 23.6 |
| Substrate 200 | APEL | — | — | — |

Example 2

Figure 6:
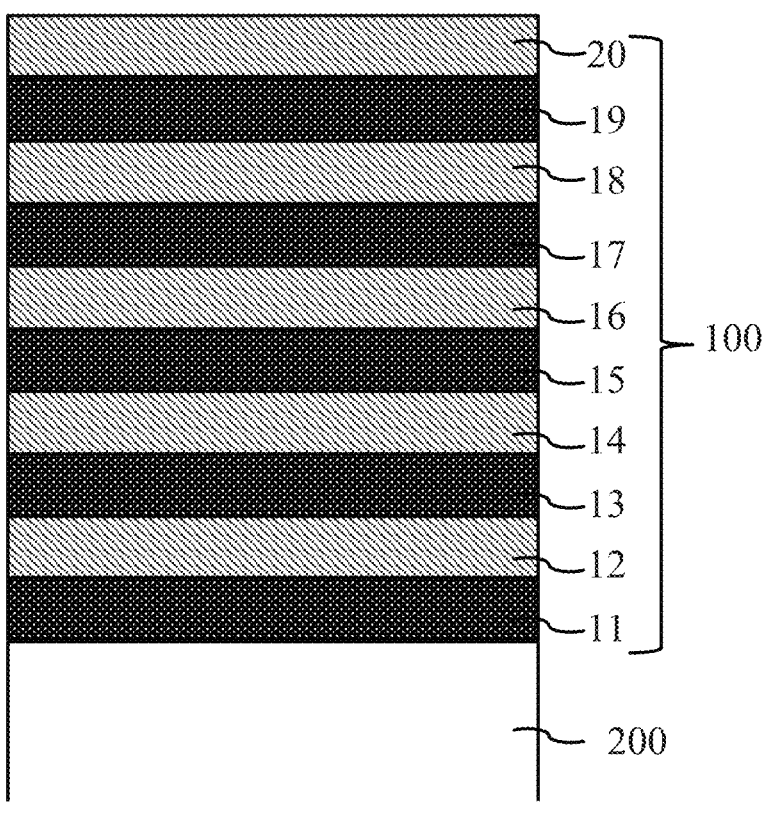
FIG. 6 is a schematic diagram which illustrates a film configuration according to Example 2.

In Example 2, the half mirror 100 having a 10-layer film configuration as shown in FIG. 6 is formed on the R1 surface of the same transparent substrate as in Example 1. As layer materials, SiO₂ is used for the thin films 12, 14, 16, 18, and 20, and Nb₂O₅, the same as in Example 1, is used for the thin films 11, 13, 15, 17, and 19.

Figure 7:
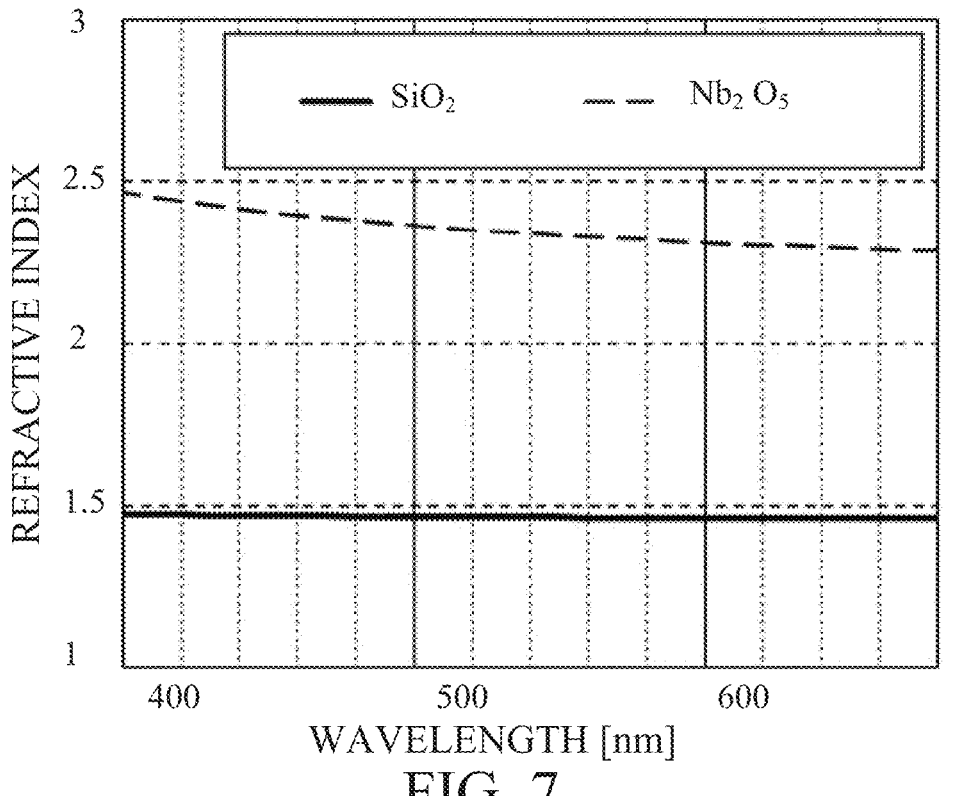
FIG. 7 is a diagram which illustrates refractive index characteristics of a vapor deposition material according to Example 2.

The half mirror 100 according to Example 2 is also formed by the vapor deposition method in the same manner as Example 1. Table 3 shows the film formation inequalities for each vapor deposition material. FIG. 7 shows the refractive index dispersion of each vapor deposition material deposited using the inequalities shown in Table 3.

The refractive index of SiO₂ at the d-line is 1.46, and the refractive index of Nb₂O₅ at the d-line is 2.31. Nb₂O₅ is the same material as in Example 1. For this reason, the inequalities (3), (4), (5), and (6) are satisfied.

Table 4 shows the total film thickness of the half mirror 100, the total film thickness of Nb₂O₅, and film thicknesses of the thin films 11 to 20, at position C at which the half open angle is 0°, position P at which the half open angle θ is 26°, and position Q at which the half open angle is 40°. From Table 4, it can be confirmed that Example 2 satisfies the inequality (2). Furthermore, at position C, the inequality (13) is satisfied. In addition, the inequalities (16) and (17) are also satisfied.

Figure 8:
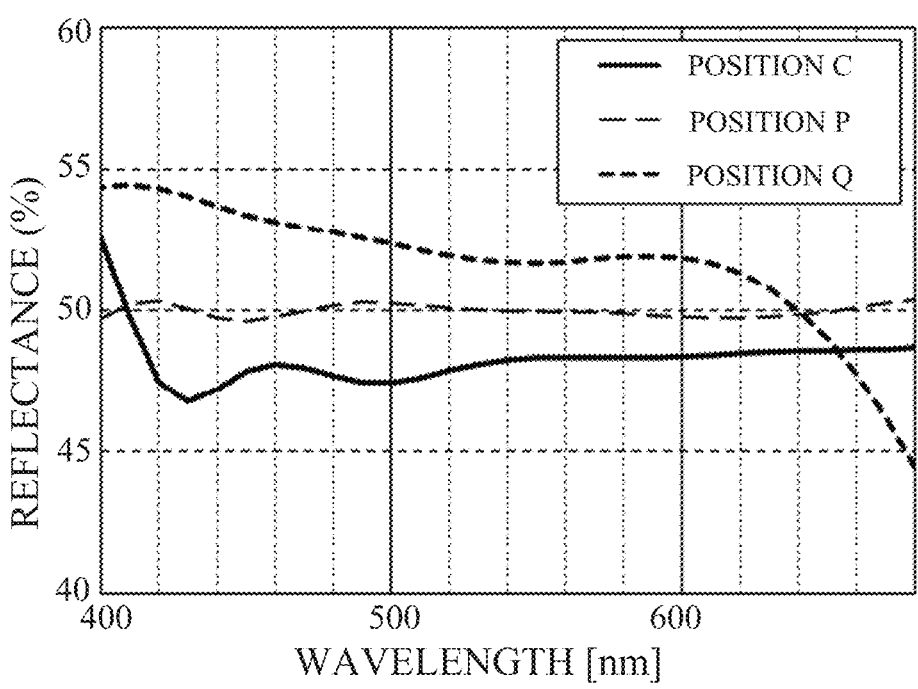
FIG. 8 is a diagram which illustrates reflectance characteristics for $0°$ incident light according to Example 2.

FIG. 8 shows the reflectance characteristics of the half mirror 100 according to Example 2 at positions C, P, and Q with respect to 0° incident light. Although the film thickness of the half mirror 100 varies depending on positions of the half open angle on the transparent substrate 200, good reflectance characteristics are achieved, with reflectance ranging between 45% and 55% at wavelengths from 420 nm to 680 nm.

TABLE 3

| Vapor Deposition Material | Film Formation Rate Å/s | Film Forming Pressure ×10⁻² Pa | Introduced Gas (Vacuum Chamber) | Assist Gas (Ion Beam) | Ion Current Density μA/cm² |
|---|---|---|---|---|---|
| SiO₂ | 6 | 1.8 | Oxygen | Oxygen | 23 |
| Nb₂O₅ | 6 | 2.6 | Oxygen | Oxygen | 50 |

TABLE 4

| | Position | C | P | Q |
|---|---|---|---|---|
| | Half Open Angle | 0° | 26° | 40° |
| | | | Physical Film Thickness (nm) | |
| | Half Mirror Total Film Thickness | 648.2 | 583.4 | 492.6 |
| | Nb₂O₅ Total Film Thickness | 245.0 | 220.5 | 186.2 |
| Half Mirror 100 | Thin Film 20 SiO₂ | 66.1 | 59.5 | 50.3 |
| | Thin Film 19 Nb₂O₅ | 67.2 | 60.5 | 51.1 |
| | Thin Film 18 SiO₂ | 119.8 | 107.8 | 91.1 |
| | Thin Film 17 Nb₂O₅ | 61.0 | 54.9 | 46.3 |
| | Thin Film 16 SiO₂ | 121.3 | 109.2 | 92.2 |
| | Thin Film 15 Nb₂O₅ | 31.2 | 28.1 | 23.7 |
| | Thin Film 14 SiO₂ | 48.3 | 43.5 | 36.7 |
| | Thin Film 13 Nb₂O₅ | 66.7 | 60.0 | 50.7 |
| | Thin Film 12 SiO₂ | 47.7 | 42.9 | 36.2 |
| | Thin Film 11 Nb₂O₅ | 18.9 | 17.0 | 14.4 |
| Substrate 200 | APEL | — | — | — |

Example 3

Figure 9:
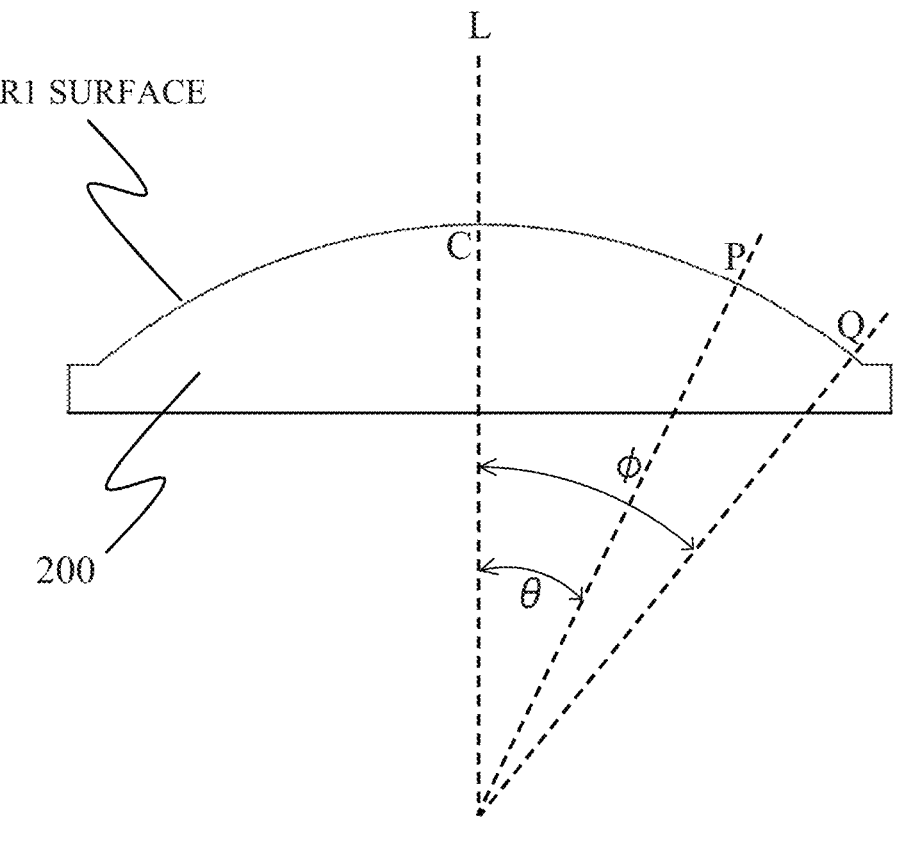
FIG. 9 is a schematic diagram of a cross-section of an optical element according to Examples 3 and 4.
Figure 10:
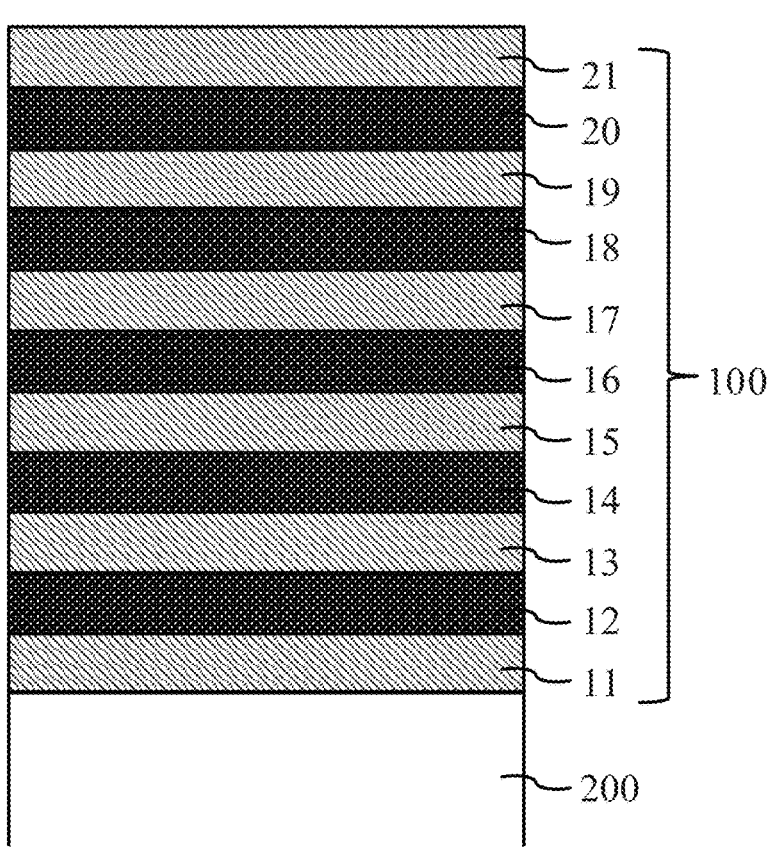
FIG. 10 is a schematic diagram which illustrates a film configuration according to Example 3.

FIG. 9 shows a cross-section of the optical element according to Example 3. The positions C, Q, and L in FIG. 9, the maximum value φ of the half open angle, and R1 are the same as those in FIG. 3. FIG. 10 shows the 11-layer film configuration of the half mirror 100 at position C.

In Example 3, APEL (manufactured by Mitsui Chemicals, Inc.) with a refractive index of 1.54 in the d-line is used as a material for the substrate 200. The R1 surface which forms the half mirror 100 has a convex shape. The half open angle φ at position Q is 40°, which satisfies the inequality (1). As layer materials, SiO₂ (containing Al: 4.5% by weight) is used for the thin films 11, 13, 15, 17, 19, and 21, and Nb₂O₅ is used for the thin films 12, 14, 16, 18, and 20.

In Example 3, the half mirror 100 is also formed by the vapor deposition method. Table 5 shows the film formation inequalities for each vapor deposition material. An ion current density during the formation of an $Nb_2O_5$ film is made smaller than in Examples 1 and 2. This reduces the refractive index.

Figure 11:
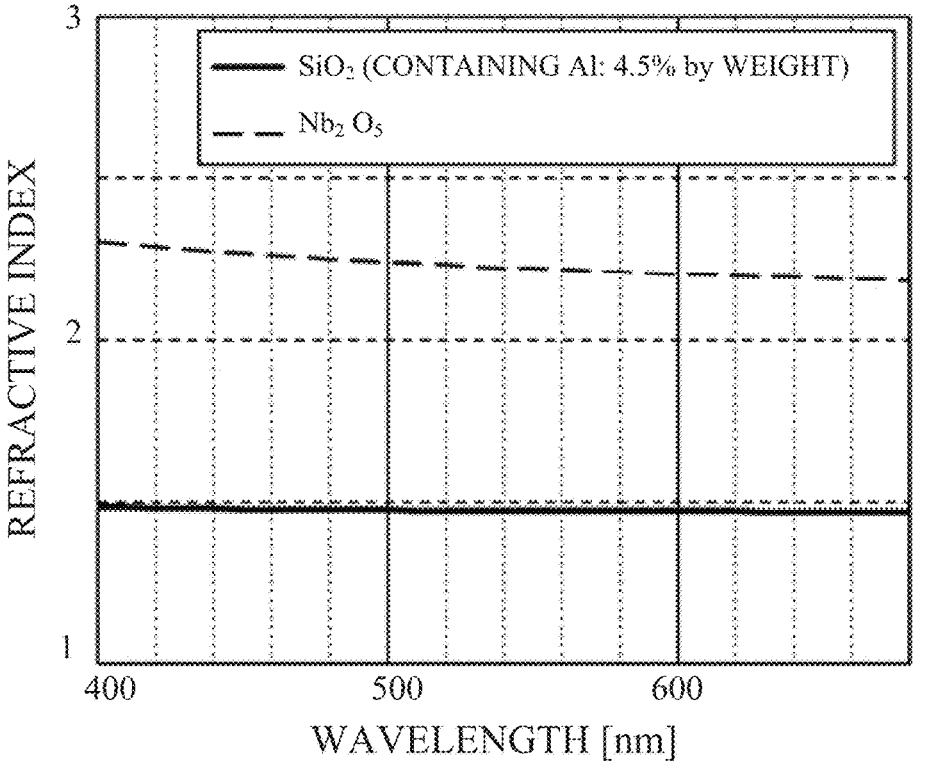
FIG. 11 is a diagram which illustrates refractive index characteristics of a vapor deposition material according to Example 3.

FIG. 11 shows the refractive index dispersion of each vapor deposition material deposited using the inequalities shown in Table 5. The refractive index of $SiO_2$ (containing Al: 4.5% by weight) at the d-line is 1.47, and the refractive index of $Nb_2O_5$ at the d-line is 2.21. These satisfy the inequalities (3), (4), and (5). The refractive index of $Nb_2O_5$ at a wavelength of 420 nm is 2.29, and the refractive index of $Nb_2O_5$ at a wavelength of 680 nm is 2.18. For this reason, $1/(n_H(420)-n_H(680))$ is 9.47, which satisfies the inequality (6).

Table 6 shows the total film thickness of the half mirror 100, the total film thickness of $Nb_2O_5$, and film thicknesses of the thin films 11 to 21, at position C at which the half open angle is 0°, position P at which the half open angle θ is 26°, and position Q at which the half open angle is 40°. From Table 6, it can be confirmed that Example 3 satisfies the inequality (2). Furthermore, at position C, the inequality (13) is satisfied. In addition, the inequalities (16) and (17) are also satisfied.

Figure 12:
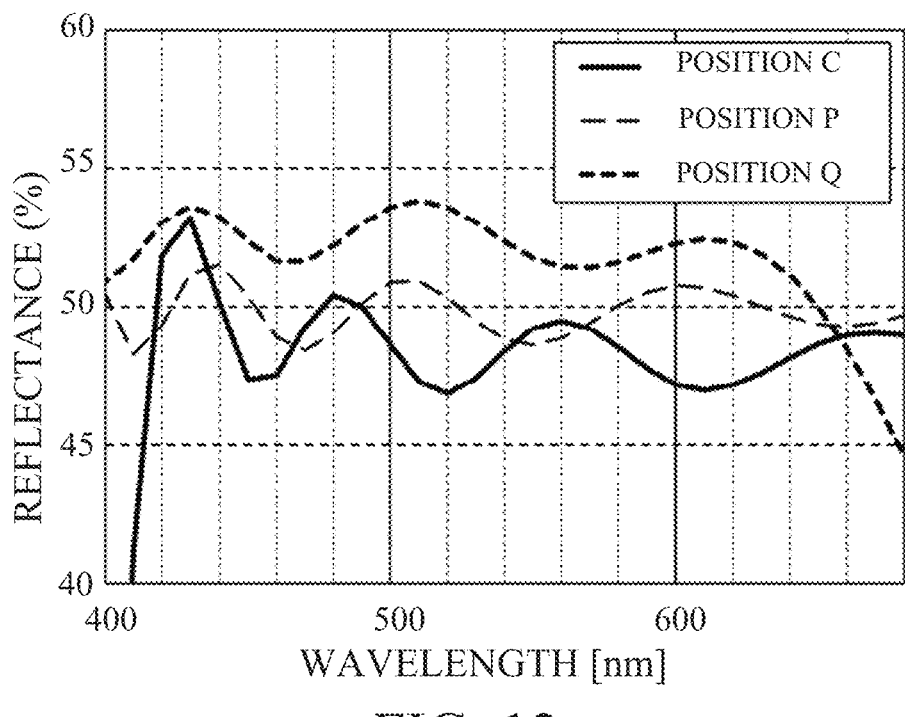
FIG. 12 is a diagram which illustrates reflectance characteristics for $0°$ incident light according to Example 3.

FIG. 12 shows the reflectance characteristics of the half mirror 100 according to Example 3 at positions C, P, and Q with respect to 0° incident light. Although the film thickness of the half mirror 100 varies depending on positions of the half open angle on the transparent substrate 200, good reflectance characteristics are achieved, with reflectance ranging between 45% and 55% at wavelengths from 420 nm to 680 nm.

TABLE 5

| Vapor Deposition Material | Film Formation Rate Å/s | Film Forming Pressure ×10⁻² Pa | Introduced Gas (Vacuum Chamber) | Assist Gas (Ion Beam) | Ion Current Density μA/cm² |
|---|---|---|---|---|---|
| $SiO_2$ (containing Al: 4.5% by weight) | 6 | 1.8 | Oxygen | Oxygen | 23 |
| $Nb_2O_5$ | 6 | 2.6 | Oxygen | Oxygen | 35 |

TABLE 6

| | Position | C | P | Q |
|---|---|---|---|---|
| | Half Open Angle | 0° | 26° | 40° |
| | | | Physical Film Thickness (nm) | |
| | Half Mirror Total Film Thickness | 965.5 | 868.9 | 733.7 |
| | $Nb_2O_5$ Total Film Thickness | 317.9 | 286.1 | 241.6 |
| Half Mirror 100 | Thin Film 21 $SiO_2$ (containing Al: 4.5% by weight) | 78.5 | 70.6 | 59.6 |
| | Thin Film 20 $Nb_2O_5$ | 82.9 | 74.6 | 63.0 |
| | Thin Film 19 $SiO_2$ (containing Al: 4.5% by weight) | 157.2 | 141.5 | 119.5 |
| | Thin Film 18 $Nb_2O_5$ | 68.9 | 62.0 | 52.3 |
| | Thin Film 17 $SiO_2$ (containing Al: 4.5% by weight) | 167.8 | 151.0 | 127.5 |
| | Thin Film 16 $Nb_2O_5$ | 45.7 | 41.2 | 34.8 |
| | Thin Film 15 $SiO_2$ (containing Al: 4.5% by weight) | 82.8 | 74.5 | 62.9 |

TABLE 6-continued

| | Position | C | P | Q |
|---|---|---|---|---|
| | Thin Film 14 $Nb_2O_5$ | 82.0 | 73.8 | 62.3 |
| | Thin Film 13 $SiO_2$ (containing Al:) 4.5% by weight) | 63.1 | 56.8 | 48.0 |
| | Thin Film 12 $Nb_2O_5$ | 38.4 | 34.6 | 29.2 |
| | Thin Film 11 $SiO_2$ (containing Al: 4.5% by weight) | 98.1 | 88.3 | 74.6 |
| Substrate 200 | APEL | — | — | — |

Example 4

Figure 13:
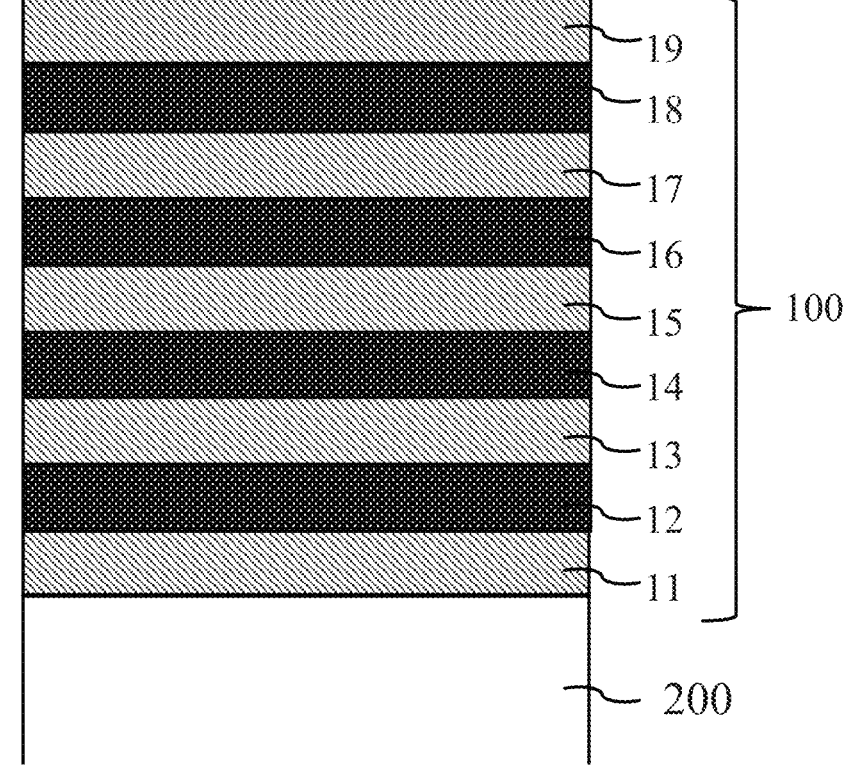
FIG. 13 is a schematic diagram which illustrates a film configuration according to Example 4.

The optical element according to Example 4 has a cross-section shown in FIG. 9 similarly to Example 3. FIG. 13 shows the nine-layer film configuration of the half mirror 100 at position C.

In Example 4, APEL (manufactured by Mitsui Chemicals, Inc.) with a refractive index of 1.54 in the d-line is used as a material for the substrate 200. The R1 surface which forms the half mirror 100 has a convex shape. The half open angle φ at position Q is 40°, which satisfies the inequality (1). As layer materials, $SiO_2$ (containing Al: 4.5% by weight) is used for the thin films 11, 13, 15, 17, and 19, and $TiO_2$ is used for the thin films 12, 14, 16, and 18.

Figure 14:
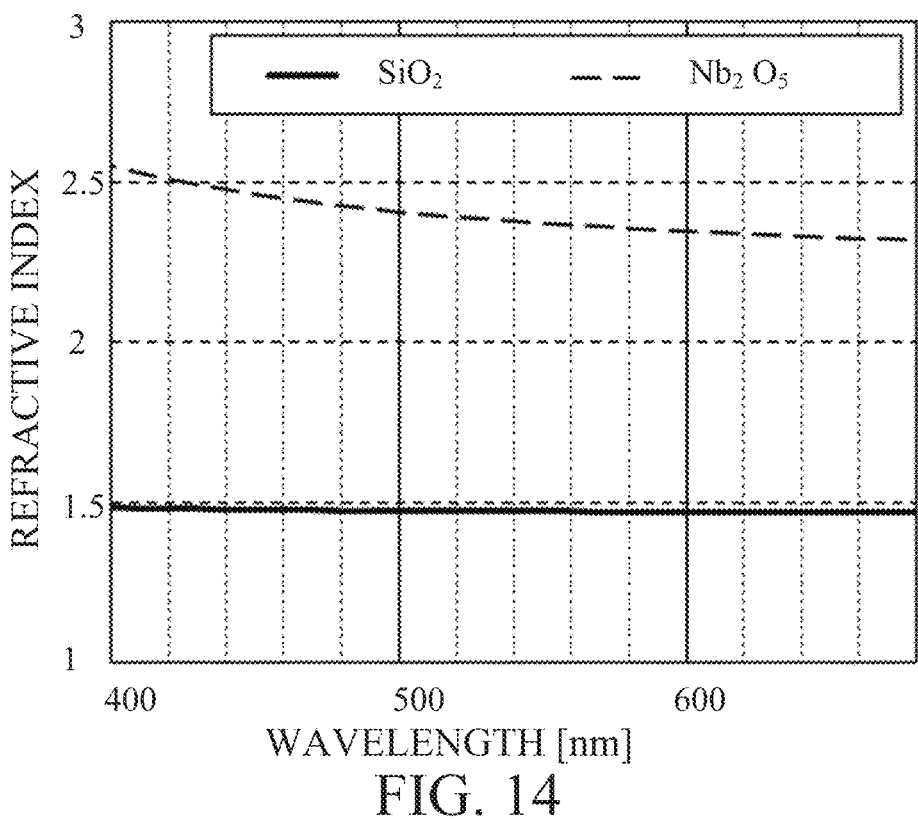
FIG. 14 is a diagram which illustrates refractive index characteristics of a vapor deposition material according to Example 4.

The half mirror 100 according to Example 4 is also formed by the ion beam assist vapor deposition method as in Example 1. Table 7 shows the film formation inequalities for each vapor deposition material. FIG. 14 shows the refractive index dispersion of each vapor deposition material deposited using the inequalities shown in Table 7. The refractive index of $SiO_2$ (containing Al: 4.5% by weight) at the d-line is 1.47, and the refractive index of $TiO_2$ at the d-line is 2.35. These satisfy the inequalities (3), (4), and (5). The refractive index of $TiO_2$ at a wavelength of 420 nm is 2.51, and the refractive index of $TiO_2$ at a wavelength of 680 nm is 2.31. For this reason, $1/(n_H(420)-n_H(680))$ is 5.30, which satisfies the inequality (6).

Table 8 shows the total film thickness of the half mirror 100, the total film thickness of $TiO_2$, and film thicknesses of the thin films 11 to 19, at position C at which the half open angle is 0°, position P at which the half open angle θ is 26°, and position Q at which the half open angle is 40°. From Table 8, it can be confirmed that Example 4 satisfies the inequality (2). Furthermore, at position C, the inequality (13) is satisfied. In addition, the inequalities (16) and (17) are also satisfied.

Figure 15:
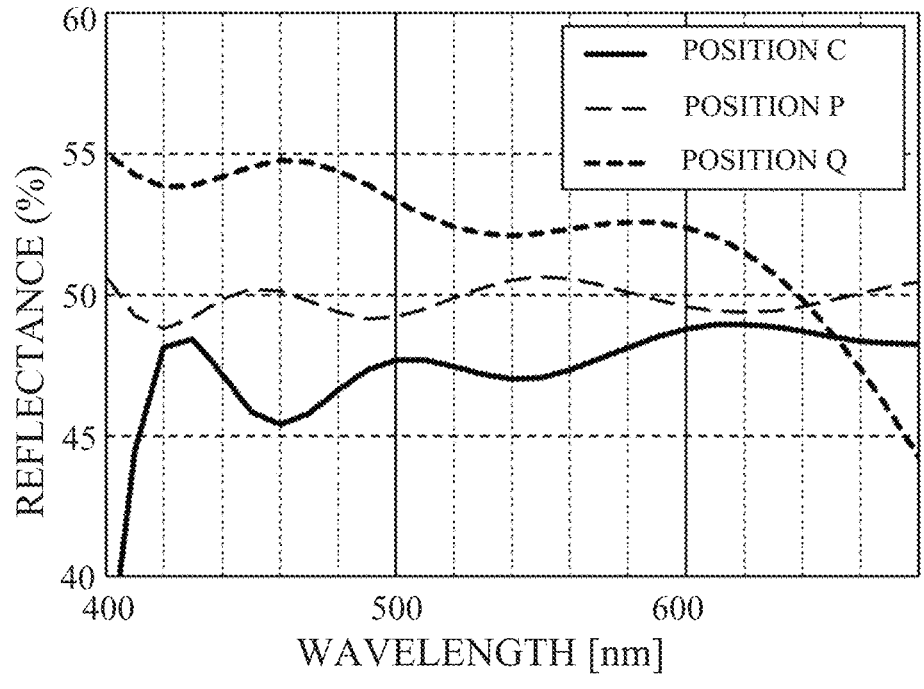
FIG. 15 is a diagram which illustrates reflectance characteristics for $0°$ incident light according to Example 4.

FIG. 15 shows the reflectance characteristics of the half mirror 100 according to Example 4 at positions C, P, and Q with respect to 0° incident light. Although the film thickness of the half mirror 100 varies depending on positions of the half open angle on the transparent substrate 200, good reflectance characteristics are achieved, with reflectance ranging between 45% and 55% at wavelengths from 420 nm to 680 nm.

TABLE 7

| Vapor Deposition Material | Film Formation Rate Å/s | Film Forming Pressure ×10⁻² Pa | Introduced Gas (Vacuum Chamber) | Assist Gas (Ion Beam) | Ion Current Density μA/cm² |
|---|---|---|---|---|---|
| $SiO_2$ (containing Al: 4.5% by weight) | 6 | 1.8 | Oxygen | Oxygen | 23 |
| $TiO_2$ | 4 | 2.6 | Oxygen | Oxygen | 50 |

13

TABLE 8

| | | Position | C | P | Q |
|---|---|---|---|---|---|
| | | Half Open Angle | 0° | 26° | 40° |
| | | | Physical Film Thickness (nm) | | |
| | | Half Mirror Total Film Thickness | 727.9 | 655.1 | 553.2 |
| | | TiO$_2$ Total Film Thickness | 185.1 | 166.6 | 140.7 |
| Half Mirror 100 | Thin Film 19 | SiO$_2$ (containing Al: 4.5% by weight) | 73.5 | 66.2 | 55.9 |
| | Thin Film 18 | TiO$_2$ | 74.7 | 67.3 | 56.8 |
| | Thin Film 17 | SiO$_2$ (containing Al: 4.5% by weight) | 137.5 | 123.8 | 104.5 |
| | Thin Film 16 | TiO$_2$ | 63.9 | 57.5 | 48.6 |
| | Thin Film 15 | SiO$_2$ (containing Al: 4.5% by weight) | 113.6 | 102.2 | 86.3 |
| | Thin Film 14 | TiO$_2$ | 29.7 | 26.7 | 22.6 |
| | Thin Film 13 | SiO$_2$ (containing Al: 4.5% by weight) | 104.5 | 94.0 | 79.4 |
| | Thin Film 12 | TiO$_2$ | 16.7 | 15.1 | 12.7 |
| | Thin Film 11 | SiO$_2$ (containing Al: 4.5% by weight) | 113.7 | 102.3 | 86.4 |
| Substrate 200 | | APEL | — | — | — |

Figure 16A:
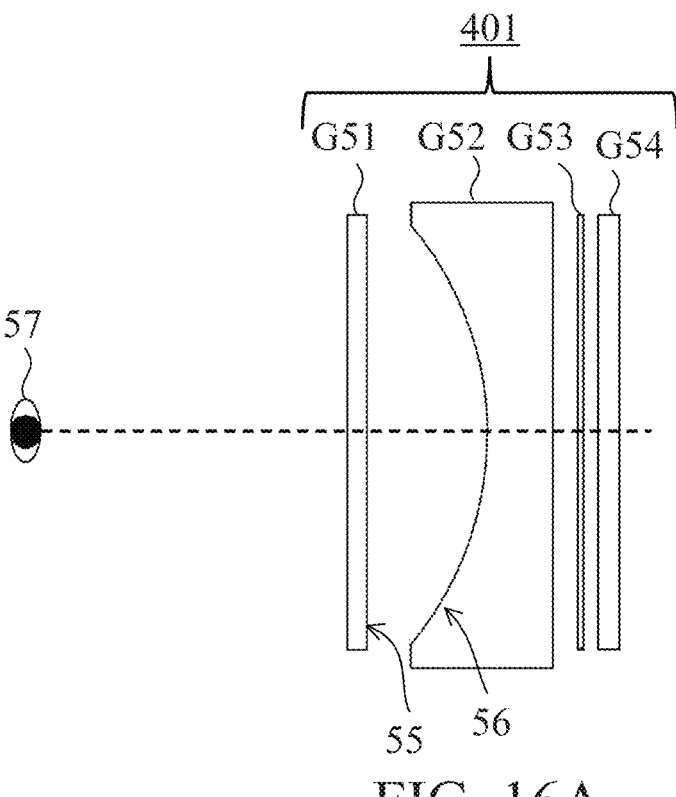
FIGS. 16A and 16B are diagrams which illustrate optical systems in which the optical systems according to Examples 1 to 4 are used.
Figure 16B:
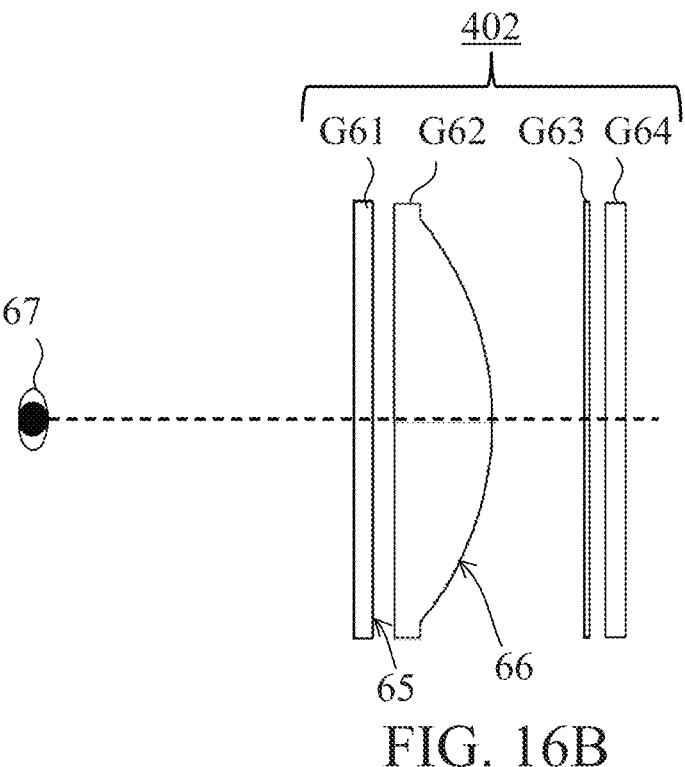

FIG. 16A shows an optical system 401 including the optical element according to Example 1 or Example 2. FIG. 16B shows an optical system 402 including the optical element according to Example 3 or Example 4. These optical systems 401 and 402 are used as an observation optical system in an optical apparatus such as an HMD.

The optical system 401 is composed of a plurality of optical elements G51 to G54, and the optical system 402 is composed of a plurality of optical elements G61 to G64.

The optical elements G51 and G61 are lenses having circularly polarized light selective reflective and transmissive mirrors on their respective surfaces 55 and 65. The optical element G52 is a lens with the half mirror 100 described in Example 1 or 2 provided on a surface 56, and the optical element G62 is a lens with the half mirror 100 described in Example 3 or 4 provided on a surface 66. The optical elements G53 and G63 are polarization conversion elements, and the optical elements G54 and G64 are display elements such as liquid crystal displays.

Light from the display elements G54 and G64 that display images enters the optical elements G53 and G63 and is converted into circularly polarized light. Fifty percent of the light (circularly polarized light) emitted from the optical elements G53 and G63 is reflected by the circularly polarized light selective reflective and transmissive mirrors on the surfaces 55 and 65 after passing through the half mirrors 100 provided on the surfaces 56 and 66. This reflected light again enters the half mirrors 100 provided on the surfaces 56 and 66, where fifth percent of the light is reflected. The reflected light from the half mirrors 100 pass through the circularly polarized light selective reflective and transmissive mirrors on the surfaces 55 and 65 and reach the eyes 57 and 67 of the user (observer).

By disposing the refractive optical elements G52 and G62 having optical power in the optical systems 401 and 402, the images displayed on the display elements G34 and G44 can be observed in an enlarged manner by the user.

The optical systems 401 and 402 are merely examples, and the optical elements of each example may be used in other optical systems.

Figure 17:
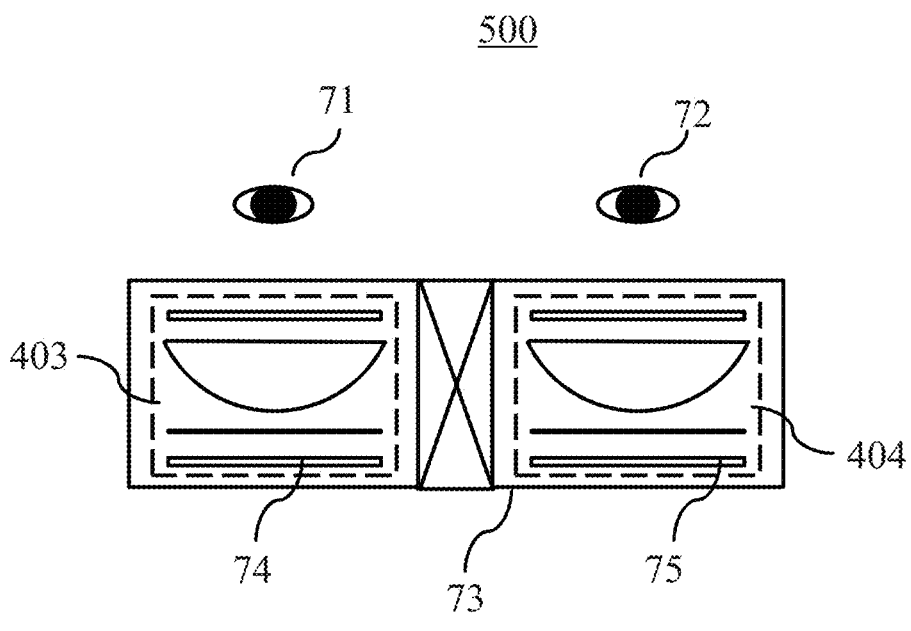
FIG. 17 is a sectional view of an optical apparatus equipped with the above optical systems.
Figure 18:
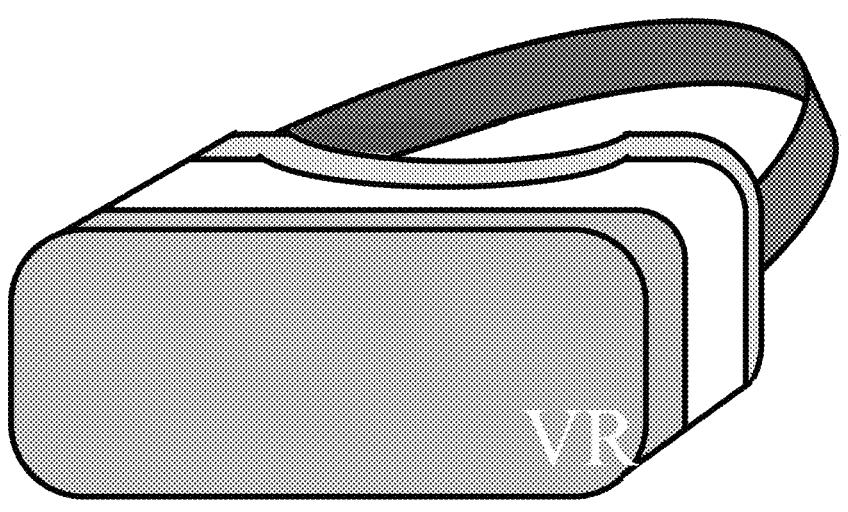
FIG. 18 is an external view of the above optical apparatus.

FIG. 17 schematically shows a cross-section of an HMD 500 as an optical apparatus. FIG. 18 shows the appearance of the HMD 500. The HMD 500 is used by being worn on the user's head.

The HMD 500 has left and right optical systems 403 and 404 including the optical elements of any of Examples 1 to 4. The optical systems 403 and 404 have the same optical configuration. The optical systems 403 and 404 are housed in a goggle-type case 73 and guide light from display elements 74 and 75 to the user's left eye 71 and right eye 72, respectively. Thereby, the user can view an enlarged image of the image displayed on the display elements 74 and 75. The display elements 74 and 75 display a left-eye image and a right-eye image that have parallax with each other, allowing the user to view a stereoscopic image.

Comparative examples for Examples 1 to 4 will be described below.

Comparative Example 1

In Comparative Example 1, a half mirror 100' having the film configuration shown in FIG. 2 is formed on the same lens as in Example 1. As layer materials, SiO$_2$ is used for the thin films 12, 14, 16, and 18, and Ti$_4$O$_7$ is used for the thin films 11, 13, 15, and 17.

Figure 19:
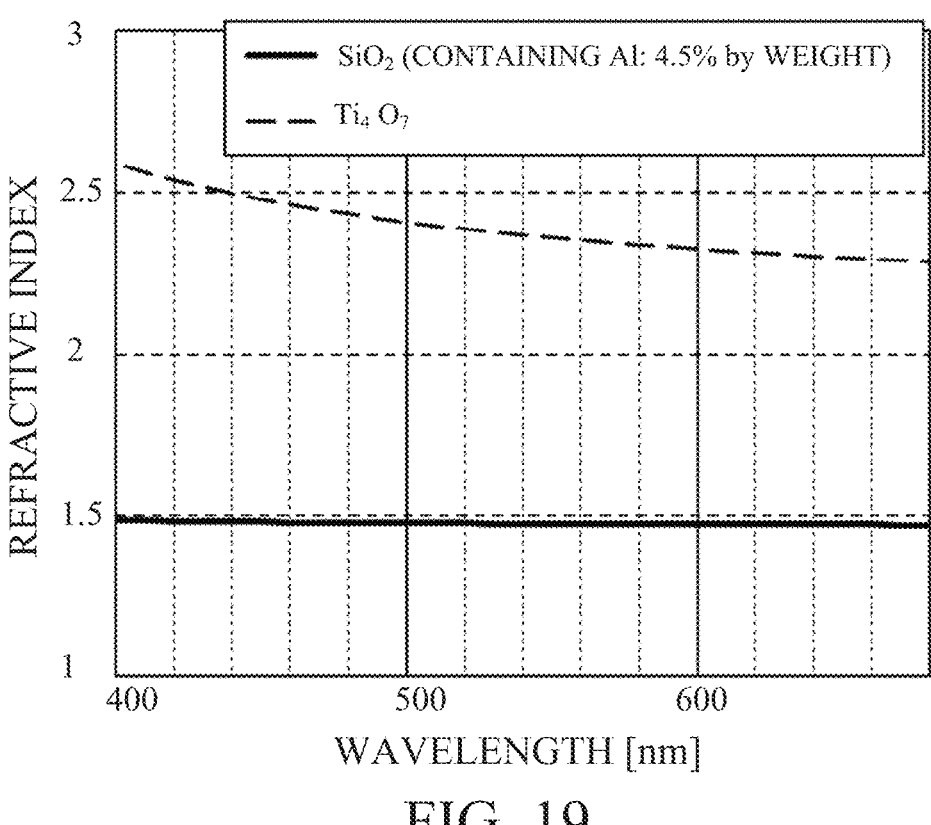
FIG. 19 is a diagram which illustrates refractive index characteristics of a vapor deposition material according to Comparative Example 1.

The half mirror 100' of Comparative Example 1 is also formed by the vapor deposition method in the same manner as in Example 1. Table 9 shows the film formation inequalities for each vapor deposition material. FIG. 19 shows the refractive index dispersion of each vapor deposition material deposited using the inequalities shown in Table 9. The refractive index of SiO$_2$ at the d-line is 1.46, and the refractive index of Ti$_4$O$_7$ at the d-line is 2.33, which satisfy the inequalities (3), (4), and (5). However, since the refractive index of Ti$_4$O$_7$ at a wavelength of 420 nm is 2.54 and the refractive index of Ti$_4$O$_7$ at a wavelength of 680 nm is 2.28, $1/(N_H(420)-n_H(680))$ is 3.91. That is, the inequality (6) is not satisfied.

Table 10 shows the total film thickness of the half mirror 100', the total film thickness of Ti$_4$O$_7$, and film thicknesses of the thin films 11 to 18, at position C at which the half open angle is 0°, position P at which the half open angle $\theta$ is 26°, and position Q at which the half open angle is 40°. From Table 10, it can be confirmed that Comparative Example 1 satisfies the inequality (2). Furthermore, at position C, the inequality (13) is satisfied. In addition, the inequalities (16) and (17) are also satisfied.

Figure 20:
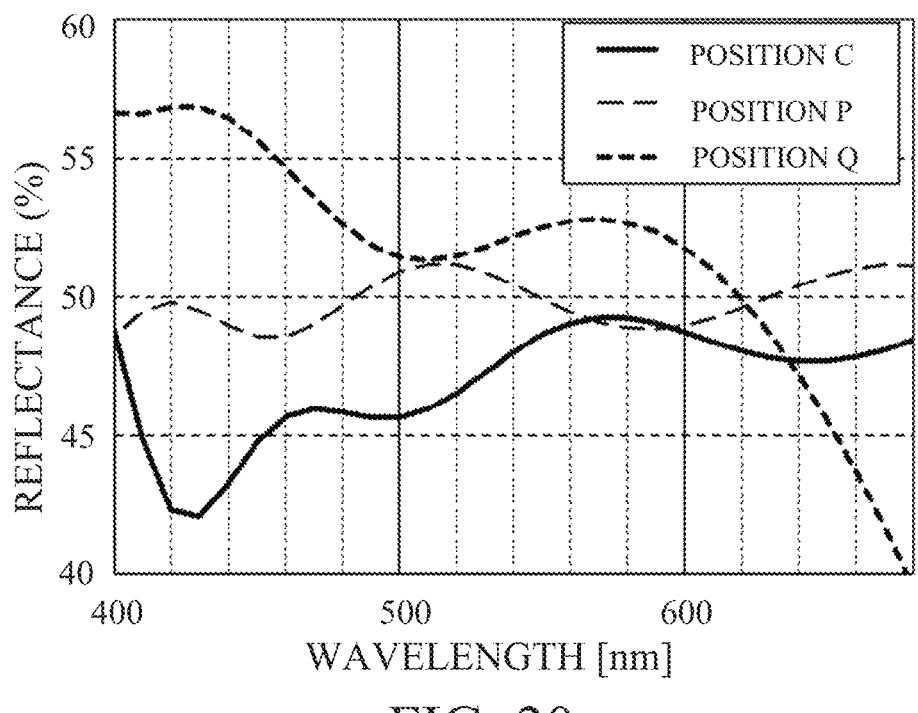
FIG. 20 is a diagram which illustrates reflectance characteristics for $0°$ incident light according to Comparative Example 1.

FIG. 20 shows the reflectance characteristics of the half mirror 100' according to Comparative Example 1 at positions C, P, and Q with respect to 0° incident light. The film thickness of the half mirror 100' varies depending on positions of the half open angle on the transparent substrate 200. The reflectance characteristic at position P falls within 45% to 55% in the wavelength range of 420 nm to 680 nm. However, at position C, the reflectance characteristics are reduced in the vicinity of wavelengths from 420 nm to 450 nm, and at position Q, in the vicinity of wavelengths from 420 nm to 460 nm and in the vicinity of wavelength 670 nm. In other words, when the inequality (6) is not satisfied, the reflectance characteristics are significantly reduced due to changes in the film thickness.

TABLE 9

| Vapor Deposition Material | Film Formation Rate Å/s | Film Forming Pressure ×10⁻² Pa | Introduced Gas (Vacuum Chamber) | Assist Gas (Ion Beam) | Ion Current Density μA/cm² |
|---|---|---|---|---|---|
| $SiO_2$ (containing Al: 4.5% by weight) | 6 | 1.8 | Oxygen | Oxygen | 23 |
| $Ti_4O_7$ | 4 | 2.6 | Oxygen | Oxygen | 50 |

TABLE 10

| | | Position | C | P | Q |
|---|---|---|---|---|---|
| | | Half Open Angle | 0° | 26° | 40° |
| | | | Physical Film Thickness (nm) | | |
| | | Half Mirror Total Film Thickness | 564.8 | 508.3 | 429.3 |
| | | $Ti_4O_7$ Total Film Thickness | 181.3 | 163.2 | 137.8 |
| Half Mirror100' | Thin Film 18 | $SiO_2$ (containing Al: 4.5% by weight) | 66.1 | 59.5 | 50.2 |
| | Thin Film 17 | $Ti_4O_7$ | 71.2 | 64.1 | 54.1 |
| | Thin Film 16 | $SiO_2$ (containing Al: 4.5% by weight) | 120.7 | 108.6 | 91.7 |
| | Thin Film 15 | $Ti_4O_7$ | 62.7 | 56.4 | 47.6 |
| | Thin Film 14 | $SiO_2$ (containing Al: 4.5% by weight) | 111.1 | 100.0 | 84.4 |
| | Thin Film 13 | $Ti_4O_7$ | 25.9 | 23.4 | 19.7 |
| | Thin Film 12 | $SiO_2$ (containing Al: 4.5% by weight) | 85.6 | 77.1 | 65.1 |
| | Thin Film 11 | $Ti_4O_7$ | 21.5 | 19.3 | 16.3 |
| Substrate 200 | | APEL | — | — | — |

Comparative Example 2

In Comparative Example 2, a half mirror 100' having the film configuration shown in FIG. 2 is formed on the same lens as in Example 1 using the same layer material and the same vapor deposition method as in Example 1. Therefore, Comparative Example 2 satisfies the inequalities (3), (4), (5), and (6). Comparative Example 2 differs from Example 1 in the film thickness of each layer.

Table 11 shows the total film thickness of the half mirror 100', the total film thickness of $Nb_2O_5$, and film thicknesses of the thin films 11 to 18, at position C at which the half open angle is 0°, position P at which the half open angle θ is 26°, and position Q at which the half open angle is 40°. From Table 11, it can be confirmed that Comparative Example 2 satisfies the inequality (2). However, at position C, the inequality (13), (16', and (17) are not satisfied.

Figure 21:
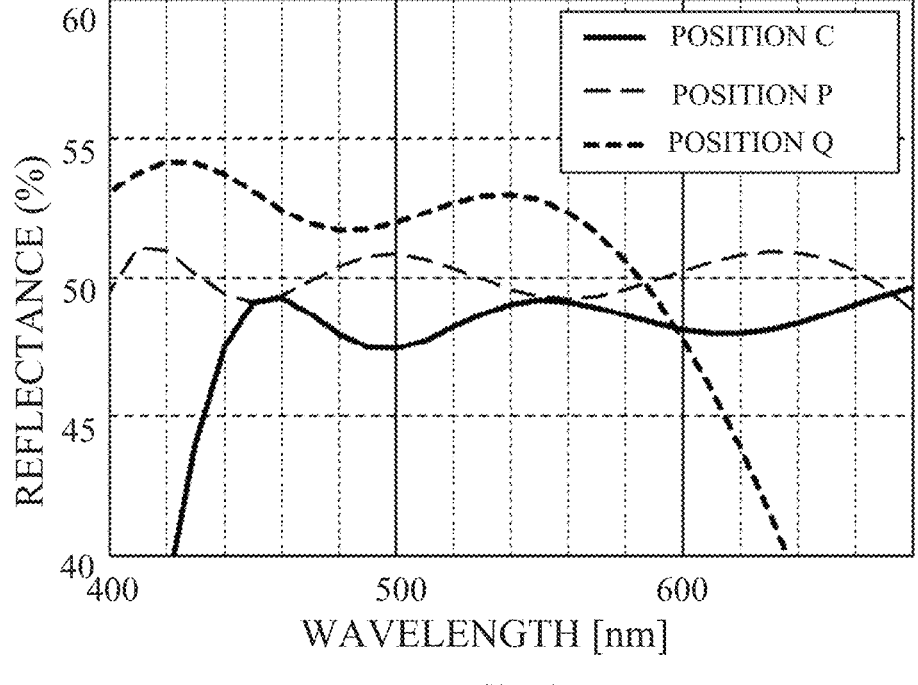
FIG. 21 is a diagram which illustrates reflectance characteristics for $0°$ incident light according to Comparative Example 2.

FIG. 21 shows the reflectance characteristics of the half mirror 100' according to Comparative Example 2 at positions C, P, and Q with respect to 0° incident light. The film thickness of the half mirror 100' varies depending on positions of the half open angle on the transparent substrate 200. The reflectance characteristic at position P falls within 45% to 55% in the wavelength range of 420 nm to 680 nm. However, at position C, the reflectance characteristics are reduced in the vicinity of wavelength 420 nm, and at position Q, in the vicinity of wavelengths from 610 nm to 680 nm. In other words, when the inequalities (13), (16), and (17) are not satisfied, the reflectance characteristics are significantly reduced due to changes in the film thickness.

TABLE 11

| | | Position | C | P | Q |
|---|---|---|---|---|---|
| | | Half Open Angle | 0° | 26° | 40° |
| | | | Physical Film Thickness (nm) | | |
| | | Half Mirror Total Film Thickness | 519.5 | 467.5 | 394.8 |
| | | $Nb_2O_5$ Total Film Thickness | 213.1 | 191.8 | 162.0 |
| Half Mirror100' | Thin Film 18 | $SiO_2$ (containing Al: 4.5% by weight) | 59.5 | 53.5 | 45.2 |
| | Thin Film 17 | $Nb_2O_5$ | 78.5 | 70.6 | 59.6 |
| | Thin Film 16 | $SiO_2$ (containing Al: 4.5% by weight) | 88.9 | 80.0 | 67.6 |
| | Thin Film 15 | $Nb_2O_5$ | 75.8 | 68.2 | 57.6 |
| | Thin Film 14 | $SiO_2$ (containing Al: 4.5% by weight) | 88.9 | 80.0 | 67.6 |
| | Thin Film 13 | $Nb_2O_5$ | 34.6 | 31.1 | 26.3 |
| | Thin Film 12 | $SiO_2$ (containing Al: 4.5% by weight) | 69.1 | 62.2 | 52.5 |
| | Thin Film 11 | $Nb_2O_5$ | 24.3 | 21.9 | 18.5 |
| Substrate 200 | | APEL | — | — | — |

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

According to the present disclosure, it is possible to provide an optical element having multilayer film that is formed on an optical surface with a curvature of a half open angle of 20° or more and has a film thickness distribution, but which does not cause variations in reflectance characteristics.

This application claims the benefit of Japanese Patent Application No. 2022-200028, filed on Dec. 15, 2022, which is hereby incorporated by reference herein in its entirety.

What is claimed is:

1. An optical element for an imaging optical system, the optical element comprising a substrate including a curved surface, and a multilayer film formed on the curved surface, wherein the multilayer film includes a plurality of first films made of a first material and a plurality of second films made of a second material, each of the plurality of first films and each of the plurality of second films are alternately laminated, and wherein the following inequalities are satisfied:

$$\varphi \geq 20°$$

$$0.75 \leq D_Q / D_C \leq 0.95$$

$$1.4 \leq n_L(587.56) \leq 1.6$$

$$1.9 \leq n_H(587.56) \leq 2.5$$

$$n_H(587.56) - n_L(587.56) \geq 0.40$$

$$1 / (n_H(420) - n_H(680)) \geq 4.5$$

where φ is a maximum value of a half open angle in an optically effective area of the curved surface, $D_C$ is a total film thickness of the multilayer film at a position at which the half open angle is 0°, $D_Q$ is a total film thickness of the multilayer film at a position at which the half open angle is φ, $n_L(\lambda)$ is a refractive index of the first material at a wavelength $\lambda$ [nm], and $n_H(\lambda)$ is a refractive index of the second material at the wavelength $\lambda$ [nm].

2. The optical element according to claim 1, wherein the following inequality is satisfied:

$$1/(n_H(420) - n_H(680)) \geq 5.0$$

3. The optical element according to claim 1, wherein the following inequalities are satisfied in a range of $420 \leq \lambda \leq 680$:

$$45\% \leq R_C \leq 55\%$$

$$45\% \leq R_Q \leq 55\%$$

where $R_C(\lambda)$ is a reflectance of the multilayer film for light of the wavelength $\lambda$ incident on a position at which the half open angle is $0°$ at an incident angle of $0°$, and $R_Q(\lambda)$ is a reflectance of the multilayer film for light of the wavelength $\lambda$ incident on a position at which the half open angle is $0°$ at an incident angle of $\varphi$.

4. The optical element according to claim 1, wherein the following inequality is satisfied:

$$0.20 \leq D_{CH}/D_C \leq 0.40$$

where $D_{CH}$ is a total film thickness of the second film at a position at which the half open angle is $0°$.

5. The optical element according to claim 1, wherein the following inequality is satisfied:

$$100 \leq d_{m-4} \leq 180$$

where m is a total number of films constituting the multilayer film, and $d_{m-4}$ is a film thickness of the (m−4)-th film counting from a side of the substrate.

6. The optical element according to claim 1, wherein the following inequality is satisfied:

$$100 \leq d_{m-2} \leq 180$$

where m is a total number of films constituting the multilayer film, and $d_{m-2}$ is a film thickness of the (m−2)-th film counting from a side of the substrate.

7. The optical element according to claim 1, wherein the following inequality is satisfied:

$$8 \leq m \leq 11$$

where m is a total number of films constituting the multilayer film.

8. The optical element according to claim 1, wherein the following inequality is satisfied:

$$1.5 \leq \alpha \leq 30.0$$

where $\alpha$ [$10^{-5}/°$ C.] is a coefficient of thermal expansion of the substrate.

9. The optical element according to claim 1, wherein the first material includes aluminum having a weight ratio of 0.001% or more and 10% or less, and silicon oxide having a weight ratio of 90% or more.

10. The optical element according to claim 1, wherein the second material includes at least one of titanium oxide or niobium oxide.

11. The optical element according to claim 1, wherein the second material includes $TiO_2$.

12. The optical element according to claim 1, wherein the second material includes $Nb_2O_5$.

13. An imaging optical system comprising an optical element, wherein the optical element includes a substrate including a curved surface, and a multilayer film formed on the curved surface, wherein the multilayer film includes a plurality of first films made of a first material and a plurality of second films made of a second material, each of the plurality of first films and each of the plurality of second films are alternately laminated, and wherein the following inequalities are satisfied:

$$\varphi \geq 20°$$

$$0.75 \leq D_Q/D_C \leq 0.95$$

$$1.4 \leq n_L(587.56) \leq 1.6$$

$$1.9 \leq n_H(587.56) \leq 2.4$$

$$n_H(587.56) - n_L(587.56) \geq 0.40$$

$$1/(n_H(420) - n_H(680)) \geq 4.5$$

where $\varphi$ is a maximum value of a half open angle in an optically effective area of the curved surface, $D_C$ is a total film thickness of the multilayer film at a position at which the half open angle is $0°$, $D_Q$ is a total film thickness of the multilayer film at a position at which the half open angle is $\varphi$, $n_L(\lambda)$ is a refractive index of the first material at a wavelength $\lambda$ [nm], and $n_H(\lambda)$ is a refractive index of the second material at the wavelength $\lambda$ [nm].

14. An optical apparatus comprising an imaging optical system, wherein the imaging optical system includes an optical element, wherein the optical element includes a substrate including a curved surface, and a multilayer film formed on the curved surface, wherein the multilayer film includes a plurality of first films made of a first material and a plurality of second films made of a second material, each of the plurality of first films and each of the plurality of second films are alternately laminated, and wherein the following inequalities are satisfied:

$$\varphi \geq 20°$$

$$0.75 \leq D_Q/D_C \leq 0.95$$

$$1.4 \leq n_L(587.56) \leq 1.6$$

$$1.9 \leq n_H(587.56) \leq 2.4$$

-continued $$n_H(587.56) - n_L(587.56) \geq 0.40$$

$$1 / (n_H(420) - n_H(680)) \geq 4.5$$

where $\varphi$ is a maximum value of a half open angle in an optically effective area of the curved surface, $D_C$ is a total film thickness of the multilayer film at a position at which the half open angle is $0°$, $D_Q$ is a total film thickness of the multilayer film at a position at which the half open angle is $\varphi$, $n_L(\lambda)$ is a refractive index of the first material at a wavelength $\lambda$ [nm], and $n_H(\lambda)$ is a refractive index of the second material at the wavelength $\lambda$ [nm].

15. The optical apparatus according to claim 14, further comprising a display element configured to display an image, wherein the imaging optical system guides light from the display element to observer's eyes.

\* \* \* \* \*